(12) United States Patent
Hosie et al.

(10) Patent No.: US 9,372,902 B2
(45) Date of Patent: Jun. 21, 2016

(54) ACCESSING AND EDITING VIRTUALLY-INDEXED MESSAGE FLOWS USING STRUCTURED QUERY LANGAUGE (SQL)

(75) Inventors: John Hosie, Eastleigh (GB); Philip Jones, Hook (GB); Gregory Lubel, Woolston (GB); Anthony H. Phillips, North Baddesley (GB); Brian Stewart, Winchester (GB); Dominic J. Storey, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1095 days.

(21) Appl. No.: 13/243,298

(22) Filed: Sep. 23, 2011

(65) Prior Publication Data
US 2013/0080452 A1 Mar. 28, 2013

(51) Int. Cl.
*G06F 17/30* (2006.01)
*G06F 7/00* (2006.01)

(52) U.S. Cl.
CPC .............................. *G06F 17/30557* (2013.01)

(58) Field of Classification Search
CPC ................................................ G06F 17/30424
USPC ....................................................... 707/752
See application file for complete search history.

(56) References Cited

U.S. PATENT DOCUMENTS

| | | | | |
|---|---|---|---|---|
| 4,794,519 A * | 12/1988 | Koizumi | ........... | G06F 17/30168 707/824 |
| 7,177,899 B2 * | 2/2007 | Ishibashi | ................. | G06F 9/546 370/352 |
| 7,191,097 B1 * | 3/2007 | Lee | ......................... | G06Q 10/06 340/524 |
| 8,627,337 B2 * | 1/2014 | Furneaux | ................ | G06F 9/546 719/313 |
| 2002/0029139 A1 * | 3/2002 | Buth | ........................ | G10L 13/07 704/201 |
| 2002/0120918 A1 * | 8/2002 | Aizenbud-Reshef et al. | | 717/127 |
| 2002/0141449 A1 * | 10/2002 | Johnson | ......................... | 370/473 |
| 2003/0014551 A1 * | 1/2003 | Ishibashi | ................. | G06F 9/546 719/310 |
| 2003/0115317 A1 * | 6/2003 | Hickson | .................. | H04L 29/06 709/224 |
| 2003/0208367 A1 | 11/2003 | Aizenbud-Reshef et al. | | |
| 2007/0190978 A1 * | 8/2007 | White et al. | ................ | 455/412.1 |
| 2008/0147707 A1 | 6/2008 | Jin et al. | | |
| 2009/0228460 A1 * | 9/2009 | Martinez et al. | ................... | 707/3 |
| 2012/0151498 A1 * | 6/2012 | Furneaux et al. | ............. | 719/314 |
| 2013/0218896 A1 * | 8/2013 | Palay | ................ | G06F 17/30312 707/741 |

* cited by examiner

*Primary Examiner* — Pavan Mamillapalli
(74) *Attorney, Agent, or Firm* — Lee Law, PLLC; Christopher B. Lee

(57) ABSTRACT

At least one message flow file that stores a message flow is read by a processor. The message flow stored within the at least one message flow file is parsed. The message flow is organized within a memory as a message flow database structure. Entries within the message flow database structure represent nodes, connections, and properties used by the message flow. The message flow database structure is edited in response to receipt of a structured query language (SQL) statement that specifies a change to the message flow database structure.

15 Claims, 8 Drawing Sheets

| ID | NODE USING PROPERTY | NODE PROPERTY NAME | NODE PROPERTY VALUE |
|---|---|---|---|
| 1 | 1 | nodes | xmi:type="MQInput.msgnode:FCMComposite_1" xmi:id="FCMComposite_1_1" location="125,121" queueName="In" |
| 2 | 1 | translation | xmi:type="utility:ConstantString" string="MS Input" |
| 3 | 2 | nodes | xmi:type="MQOutput.msgnode:FCMComposite_1" xmi:id="FCMComposite_1_2" location="458,62" queueName="Out" |
| 4 | 2 | translation | xmi:type="utility:ConstantString" string="MS Output" |
| 5 | 3 | nodes | xmi:type="Compute.msgnode:FCMComposite_1" xmi:id="FCMComposite_1_3" location="278,121" computeExpression=X |
| 6 | 3 | translation | xmi:type="utility:ConstantString" string="Compute" |
| 7 | 4 | nodes | xmi:type="FileOutput.msgnode:FCMComposite_1" xmi:id="FCMComposite_1_4" location="453,182" |
| 8 | 4 | translation | xmi:type="utility:ConstantString" string="File Output" |

FIG. 4B

ACCESSING AND EDITING VIRTUALLY-INDEXED MESSAGE FLOWS USING STRUCTURED QUERY LANGAUGE (SQL)

BACKGROUND

The present invention relates to message flows. More particularly, the present invention relates to accessing and editing virtually-indexed message flows using structured query language (SQL).

A message flow file is used to describe a message flow. The message flow described within the message flow file includes nodes that are used to process a message via the message flow, properties of the nodes, and connections between the nodes. The message flow file may also describe other objects in a message flow, such as sticky notes or other objects.

BRIEF SUMMARY

A method includes reading, via a processor, at least one message flow file that stores a message flow; parsing the message flow stored within the at least one message flow file; organizing the message flow within a memory as a message flow database structure, where entries within the message flow database structure represent nodes, connections, and properties used by the message flow; and editing the message flow database structure in response to receipt of a structured query language (SQL) statement that specifies a change to the message flow database structure.

A system includes a memory and a processor programmed to read at least one message flow file that stores a message flow; parse the message flow stored within the message flow file; organize the message flow within the memory as a message flow database structure, where entries within the message flow database structure represent nodes, connections, and properties used by the message flow; and edit the message flow database structure in response to receipt of a structured query language (SQL) statement that specifies a change to the message flow database structure.

A computer program product includes a computer readable storage medium including computer readable program code, where the computer readable program code when executed on a computer causes the computer to read at least one message flow file that stores a message flow; parse the message flow stored within the at least one message flow file; organize the message flow within a memory as a message flow database structure, where entries within the message flow database structure represent nodes, connections, and properties used by the message flow; and edit the message flow database structure in response to receipt of a structured query language (SQL) statement that specifies a change to the message flow database structure.

BRIEF DESCRIPTION OF THE SEVERAL VIEWS OF THE DRAWINGS

FIG. 4B is a diagram of an example of an implementation of a second portion of a virtual database structure stored within a memory area for automated accessing and editing of virtually-indexed message flows using structured query language (SQL) according to an embodiment of the present subject matter;

DETAILED DESCRIPTION

Figure 1:
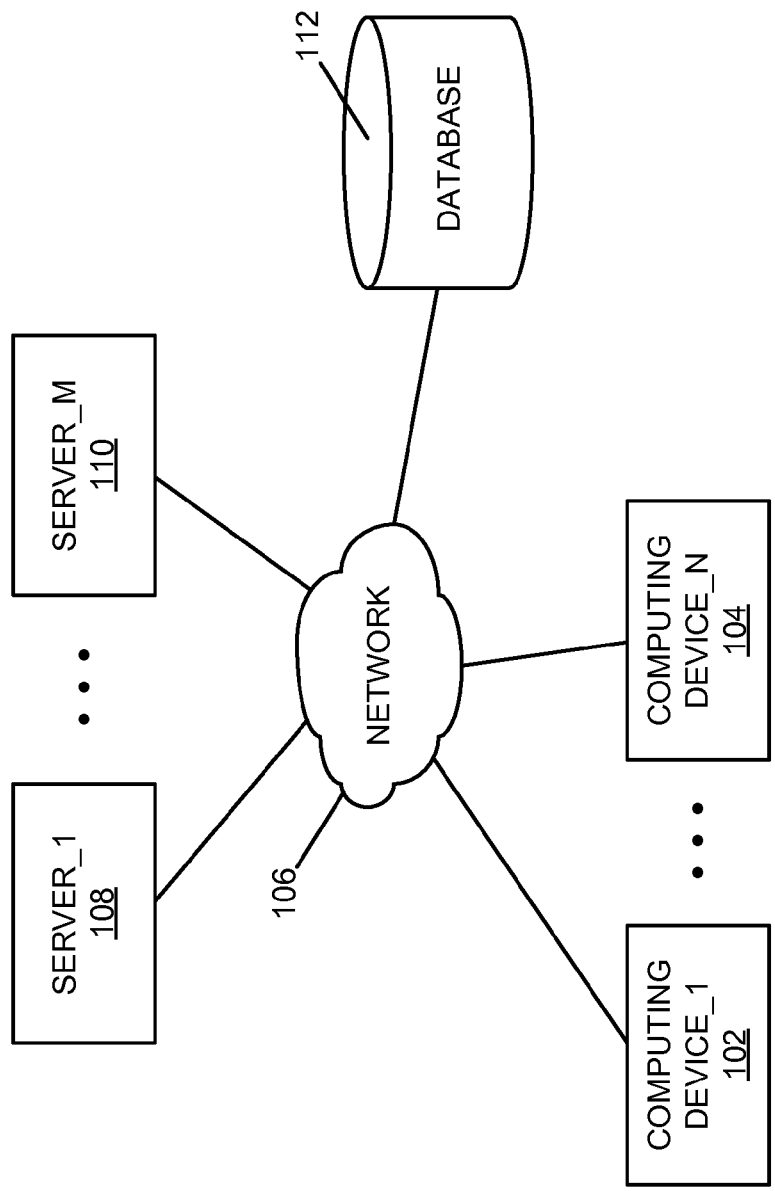
FIG. 1 is a block diagram of an example of an implementation of a system for automated accessing and editing of virtually-indexed message flows using structured query language (SQL) according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for accessing and editing of virtually-indexed message flows using structured query language (SQL). The present subject matter provides a virtual index of message flows. The virtual index of message flows is accessible using SQL statements. As such, the structure and contents of message flows may be queried and edited using a language-based approach rather than text editing the message flow files. Requests to process message flows are detected. A virtually-indexed message flow database structure is created, either directly or using a database connectivity driver. The virtually-indexed message flow database structure is created from a message flow that is either stored within one or more message flow files in a workspace storage location or from a message flow that is deployed within a message broker runtime environment. SQL statements are processed against the virtually-indexed message flow database structure, and any updates are applied to the virtually-indexed message flow database structure. The original message flow may be overwritten either within the workspace storage location or within a message broker runtime environment, or one or more new message flow files may be created in response to any changes to the message flow.

The present subject matter provides a message flow processing tool that may be executed either by a command line invocation or within a graphical user interface (GUI). A message flow or set of message flows are detected and received as inputs (e.g., in response to selection by a user) to the message flow processing tool. The message flow or set of message flows may be specified by reference to one or more message flow files. The message flow processing tool reads in the message flow(s), parses the message flow(s), and arranges the objects within the message flow into a database structure. The database structure may be created within an actual database or may be a "virtual" database structure that allows message flows to be accessed from message flow files stored within a workspace without loading the message flows into an actual database.

As such, for purposes of the present description, the database structure will be referred to as a "virtual database" or "virtual database structure" because there is no requirement for the database structure formed from the message flow files to be instantiated or installed into an actual database for access and editing of message flows. Additionally, the phrase "virtual database structure" is used for convenience of reference to SQL processing. As such, the phrase "virtual database structure" should not be considered limiting and may be considered one possible example implementation of a "virtual index" of message flows. Accordingly, these phrases may be considered interchangeable for purposes of the present description. It should be understood that other formats for a virtual index of message flows are possible and all are considered within the scope of the present subject matter. It is further understood that the "virtual database," "virtual database structure," and "virtual index" of message flows will exist and be operated upon within a memory device.

The virtual database structure is arranged with linked tables for flows, nodes, nodes properties, and other aspects of the respective message flow(s). The entries in the virtual database structure are linked such that the nodes in a given flow are linked to the respective entry for the flow in the respective flow table. For example, a node may be represented as a table, with properties represented as columns and connections represented as relationships between nodes.

With the virtual database structure created that links elements of the message flow, SQL statements may be processed against the virtual database structure. Users may input SQL syntax commands to perform queries on the data contained within the represented message flow(s). The user may select objects from the tables, and processing may be performed to provide information about the respective objects. SQL statements may be received and processed to update or insert rows into the tables. These update or insert commands may be processed to modify or add objects to the respective message flow(s). In response to an indication that the user has made all intended changes to the message flow(s) using SQL statement(s), the message flow processing tool will use the tables in the virtual database structure to update the original message flow file(s) or create one or more new message flow files that include the message flow(s) and changes to the message flow(s).

It should be understood that a virtual database structure may be organized within an actual database without departure from the scope of the present subject matter. The virtual database structure may alternatively be implemented within any memory device appropriate for a given implementation.

It should be noted that using SQL processing to access and edit message flows provides a stable platform for message flow editing that may reduce message flow editing complexity while improving user message flow editing efficiency. For example, an SQL expression may be executed that queries all queue names from all MQInput nodes in all message flows (e.g., using a SELECT statement). Equally, an SQL expression may be executed that adds a prefix to all input queue names across all message flows (e.g., using an UPDATE statement). As such, a user may rapidly modify message flows without concern for syntactic errors at the message flow level because the message flow processing tool manages message flow syntax changes in response to SQL commands received from the user. Many other examples of use of SQL to access and edit virtually-indexed message flows are possible and all are considered within the scope of the present subject matter.

As such, the present subject matter provides a variety of technological approaches for accessing and editing virtually-indexed message flows using SQL. As one example, a virtual database driver may be used to access and edit message flows within message flow files stored within an underlying workspace using SQL. Because the message flow files are accessed within the underlying workspace, the message flows do not have to be loaded into a temporary database to allow execution of SQL statements within this example implementation. Alternatively, message flows may be loaded from message flow files into a temporary/virtual database for execution of the SQL statements.

As another alternative, message flows deployed within a message broker runtime environment may be queried and directly manipulated within the runtime environment using SQL statements. In such an implementation, the present subject matter may be implemented, for example, as an open database connectivity (ODBC) driver or a Java™ programming language database connectivity (JDBC) database driver by using an operational management application programming interface (API) within a message broker application (e.g., CMP API). Within this form of implementation, the respective database driver may be considered a "virtual" database driver that actually accesses files in the underlying workspace. One parameter that may be passed to the virtual database driver may include a workspace location where the message flow(s) are stored. The message flow processing tool may process the files, against which the SQL expressions may be executed, without loading the message flows into a temporary database.

As such, message flows may be accessed in a variety of formats and environments. Further, message flows may be queried and edited using SQL independently of the particular format or environment associated with the message flow.

It should be noted that conception of the present subject matter resulted from recognition of certain limitations associated with editing message flows stored within one or more message flow files. Conventional message flow editing requires a user to utilize a text editor or a toolkit associated with a message flow creation package to edit message flow files. However, certain aspects of a message flow, such as connections between nodes, are difficult to identify and edit using these conventional methods. Additionally, message flow toolkits are only available for certain operating system platforms. Additionally, an advanced user may not wish to install a message flow toolkit even if their operating system supports the toolkit application. The present subject matter improves message flow and message flow file access and editing by utilizing a structured query language (SQL) to access and edit virtually-indexed message flows within one or more message flow files. It was additionally recognized that SQL provides an intuitive syntax that may be used for message flow editing. As such, new message flow users may directly perform operations on a message flow without having to learn how to use a message flow software application or toolkit. As such, improved message flow and message flow file access and editing may be obtained via accessing and editing of virtually-indexed message flows using SQL as described herein.

The accessing and editing of virtually-indexed message flows using structured query language (SQL) described herein may be performed in real time to allow prompt access and editing of message flows. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated accessing and editing of virtually-indexed message flows using structured query language (SQL). A computing device_1 102 through a computing device_N 104 communicate via a network 106 with a server_1 108 through a server_M 110. Any of the computing device_1 102 through the computing device_N 104 and the server_1 108 through the server_M 110 may implement the automated accessing and editing of virtually-indexed message flows using structured query language (SQL).

The respective devices may implement the automated accessing and editing of virtually-indexed message flows using structured query language (SQL) locally within a local memory of the respective device(s) using a virtual database or virtual database driver, as described in more detail below. Alternatively, the respective devices may implement the automated accessing and editing of virtually-indexed message flows using structured query language (SQL) using an actual database, such as the database 112.

As will be described in more detail below in association with FIG. 2 through FIG. 6B, the automated accessing and editing of virtually-indexed message flows using structured query language (SQL) is based upon formation of virtual indexes of message flows stored in message flow files and the use of SQL to access and edit the message flow. The present subject matter alleviates a learning curve that may be associated with message broker applications and alleviates complexity that may be associated with text editing of message flow files.

It should be noted that the computing device_1 102 through the computing device_N 104 may be portable computing devices, either by a user's ability to move the respective computing device to different locations, or by the computing device's association with a portable platform, such as a plane, train, automobile, or other moving vehicle. It should also be noted that the respective computing devices may be any computing device capable of processing information as described above and in more detail below. For example, the computing device_1 102 through the computing device_N 104 may include devices such as a personal computer (e.g., desktop, laptop, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102, via a network, such as the network 106. As such, the server_1 108 through the server_M 110 may each include a web server, application server, or other data server device.

Figure 2:
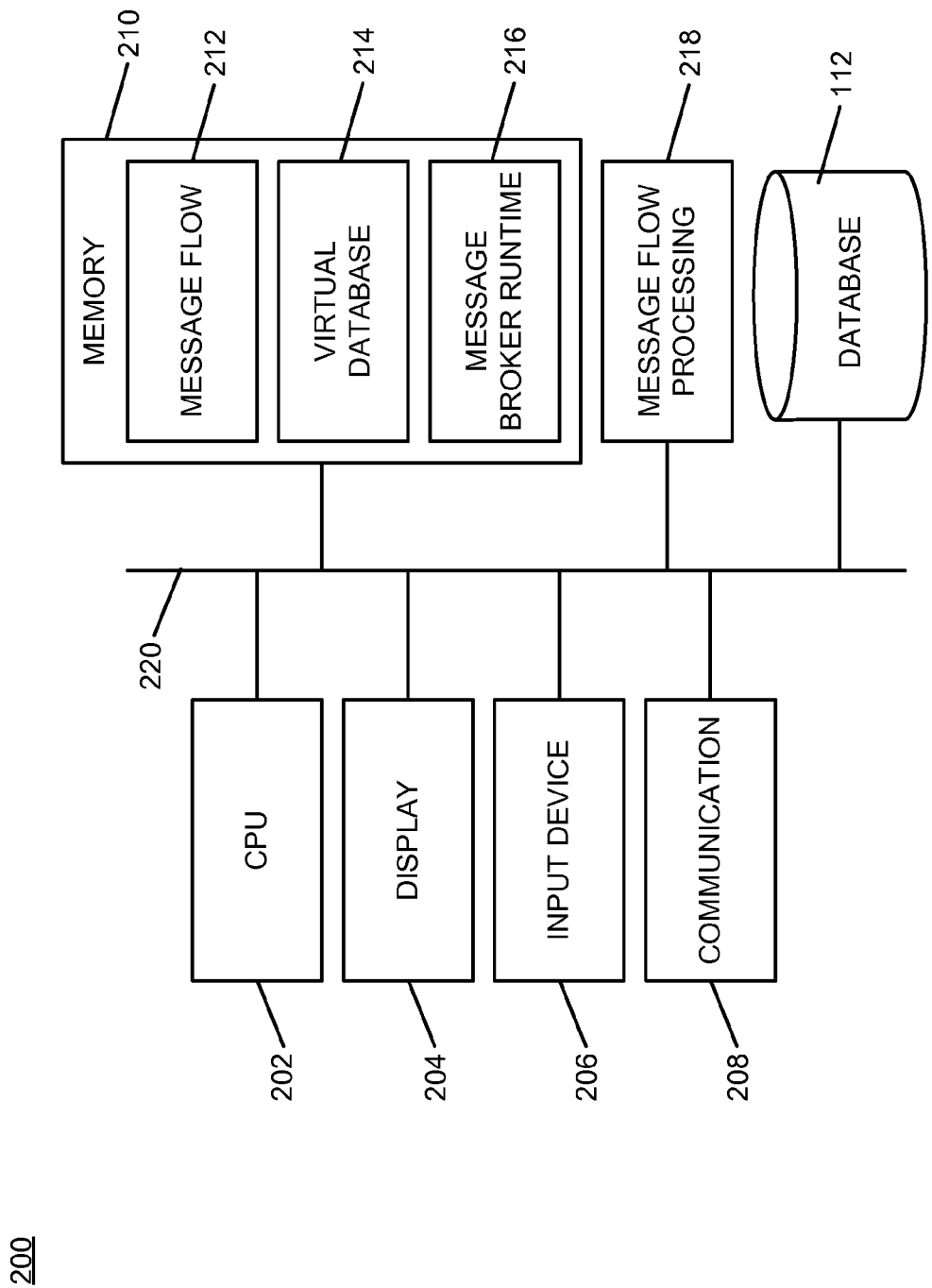
FIG. 2 is a block diagram of an example of an implementation of a core processing module capable of performing automated accessing and editing of virtually-indexed message flows using structured query language (SQL) according to an embodiment of the present subject matter.

FIG. 2 is a block diagram of an example of an implementation of a core processing module 200 capable of performing automated accessing and editing of virtually-indexed message flows using structured query language (SQL). The core processing module 200 may be associated with any of the computing device_1 102 through the computing device_N 104 and the server_1 108 through the server_M 110, as appropriate for a given implementation. Further, the core processing module 200 may provide different and complementary processing of virtually-indexed message flows in association with each implementation, as described in more detail below.

As such, for any of the examples herein, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a message flow storage area 212 that stores one or more message flow files for processing within the core processing module 200. The message flow storage area 212 may also operate as a message flow virtual index processing area, as described above and in more detail below. As will be described in more detail below, message flows stored within the message flow storage area 212 may be formed into a virtual index for access and editing using SQL statements.

A virtual database area 214 provides virtual database capabilities for virtual indexing of message flows stored within the message flow storage area 212 for implementations where the message flows within the message flow file(s) are accessed and editing using a virtual database driver. As such, the virtual database area 214 represents a memory area for processing of message flows using a virtual database driver.

A message broker runtime environment 216 provides execution space for a message broker application. The message broker application may be executed within the message broker runtime environment 216 by the CPU 202.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A message flow processing module 218 is also illustrated. The message flow processing module 218 provides virtually-indexed message flow processing capabilities for the core processing module 200, as described above and in more detail below. The message flow processing module 218 implements the automated accessing and editing of virtually-indexed message flows using structured query language (SQL) of the core processing module 200. The message flow processing module 218 represents one possible implementation of the message flow processing tool described herein.

Though the message flow processing module 218 is illustrated as a component-level module for ease of illustration and description purposes, it should be noted that the message flow processing module 218 may include any hardware, programmed processor(s), and memory used to carry out the functions of this module as described above and in more detail below. For example, the message flow processing module 218 may include additional controller circuitry in the form of application specific integrated circuits (ASICs), processors, and/or discrete integrated circuits and components for performing communication and electrical control activities associated with the respective devices. Additionally, the message flow processing module 218 may include interrupt-level, stack-level, and application-level modules as appropriate. Furthermore, the message flow processing module 218 may include any memory components used for storage, execution, and data processing for performing processing activities associated with the module.

It should also be noted that the message flow processing module 218 may form a portion of other circuitry described without departure from the scope of the present subject matter. Further, the message flow processing module 218 may alternatively be implemented as an application stored within the memory 210. In such an implementation, the message flow processing module 218 may include instructions executed by the CPU 202 for performing the functionality described herein. The CPU 202 may execute these instructions to provide the processing capabilities described above and in more detail below for the core processing module 200. The message flow processing module 218 may form a portion of an interrupt service routine (ISR), a portion of an operating system, a portion of a browser application, or a portion of a separate application without departure from the scope of the present subject matter.

The database 112 is also shown associated with the core processing module 200 within FIG. 2 to show that the database 112 may be coupled to the core processing module 200 without requiring external connectivity, such as via the network 106.

The CPU 202, the display 204, the input device 206, the communication module 208, the memory 210, the message flow processing module 218, and the database 112 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
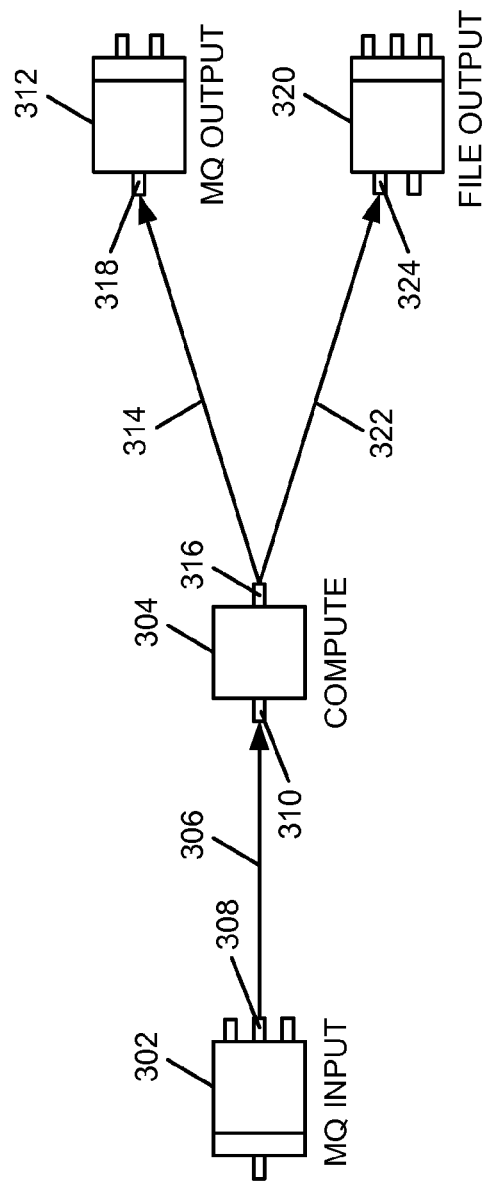
FIG. 3 is a block diagram of an example of an implementation of a message flow for automated accessing and editing of virtually-indexed message flows using structured query language (SQL) according to an embodiment of the present subject matter.

FIG. 3 is a block diagram of an example of an implementation of a message flow 300 for automated accessing and editing of virtually-indexed message flows using structured query language (SQL). It is understood that the example message flow 300 represents a message flow that may be generated by a message broker application within a graphical user interface (GUI), and may be captured into a syntactic form and stored to one or more message flow files within a memory area, such as the message flow storage area 212. The resulting stored message flow files may be parsed and formed into a virtual index of message flows, and may be accessed and edited as described herein using SQL statements. A detailed description of FIG. 3 will be provided further below in favor of additional overview at this point in the description of the present subject matter.

As described above, several variations of technological approaches for accessing and editing virtually-indexed message flows using SQL are possible. As one example, a virtual database driver may be used to access and edit message flows within message flow files stored within an underlying workspace, such as within the message flow storage area 212 of the memory 210, using SQL. Because the message flow files are accessed within the underlying workspace, the message flows do not have to be loaded into a temporary database, such as the database 112, to allow execution of SQL statements within this example implementation. Alternatively, message flows may be loaded from message flow files into a temporary/virtual database, such as a virtual database formed within the virtual database area 214, for execution of the SQL statements.

As another example/alternative, message flows deployed within a message broker runtime environment, such as the message broker runtime environment 216, may be queried and directly manipulated within that runtime environment using SQL statements. In such an implementation, the present subject matter may be implemented, for example, as an open database connectivity (ODBC) driver or a Java™ programming language database connectivity (JDBC) database driver by using an operational management application programming interface (API) within a message broker application (e.g., CMP API) executed by the CPU 202. Within this form of implementation, the respective database driver may be considered a "virtual" database driver that actually accesses files in the underlying workspace. One parameter that may be passed to the virtual database driver may include a workspace location where the message flow(s) are stored, such as the message flow storage area 212. The message flow processing module 218 may process the files, against which the SQL expressions may be executed, without loading the message flows into a temporary database, such as the database 112.

As such, message flows may be accessed in a variety of formats and environments. Further, message flows may be queried and edited using SQL independently of the particular format or environment associated with the message flow.

Returning to the description of the example message flow 300 of FIG. 3, a message queue input (MQ Input) node 302 is shown interconnected with a compute node 304 via a connection 306. The connection 306 connects an output terminal 308 of the MQ Input node 302 to an input terminal 310 of the compute node 304.

The compute node 304 is interconnected with a message queue output (MQ Output) node 312 via a connection 314. The connection 314 connects an output terminal 316 of the compute node 304 to an input terminal 318 of the MQ Output node 312.

The compute node 304 is also interconnected with a File Output node 320 via a connection 322. The connection 322 connects the output terminal 316 of the compute node 304 to an input terminal 324 of the File Output node 320.

As described above, the example message flow 300 of FIG. 3 may be captured and represented syntactically for storage and processing of SQL statements against the message flow 300. As such, for purposes of the present example, the message flow 300 is represented within the following example pseudo syntax that may be stored in a file, such as within the message flow storage area 212 of the memory 210. A graphic file named "Patent_flow.gif" represents the message flow 300 as described above and as illustrated within FIG. 3.

Node names are represented within the following example pseudo syntax (e.g., "MQ Input" for the MQ Input node 302) as captured by a computing device from the entered graphic format shown within FIG. 3. Each node is given a node identifier (ID) assigned by the syntactic capture process (e.g., "FCMComposite_1_1" for the MQ Input node 302 and "FCMComposite_1_3" for the compute node 304).

Each connection is also assigned a connection ID (e.g., "FCMConnection_1" for the connection 306). The node IDs are used within the connections syntax area to define the connections between the respective nodes (e.g., where the connection 306 is represented by xmi:id="FCMConnection_1" and the target compute node 304 is represented as targetNode="FCMComposite_1_3" and the source MQ Input node 302 is represented as sourceNode="FCMComposite_1_1"). The source and target terminals are also represented within the connection syntax (e.g., sourceNode="FCMComposite_1_1" for the output terminal 308 and targetTerminalName="InTerminal.in" for the input terminal 310). It should additionally be noted that a compute expression is identified within the example pseudo syntax for the compute node 304 (e.g., computeExpression="esql://routine/#Patent_flow_Compute.Main"). The remainder of the node and connection syntax capture may be properly understood in view of the examples described above.

Comment blocks/tags are added to identify the node and connection sections within the following example pseudo syntax for ease of location of these syntax areas. The following pseudo syntax illustrates one possible capture of a syntactic representation of the example message flow 300.

```
<?xml version="1.0" encoding="UTF-8"?>
<ecore:EPackage xmi:version="2.0"
    xmlns:xmi=http://www.domain.org/XMI
        xmlns:ComCompanyCompute.msgnode="ComCompanyCompute.msgnode"
        xmlns:ComCompanyFileOutput.msgnode="ComCompanyFileOutput.msgnode"
        xmlns:ComCompanyMQInput.msgnode="ComCompanyMQInput.msgnode"
        xmlns:ComCompanyMQOutput.msgnode="ComCompanyMQOutput.msgnode"
        xmlns:ecore="http://www.eclipse.org/emf/2002/Ecore"
        xmlns:eflow="http://www.Company.com/wbi/2005/eflow"
        xmlns:utility="http://www.Company.com/wbi/2005/eflow_utility"
        nsURI="Patent_flow.msgflow"
        nsPrefix="Patent_flow.msgflow">
<eClassifiers xmi:type="eflow:FCMComposite" name="FCMComposite_1">
    <eSuperTypes href="http://www.Company.com/wbi/2005/eflow#//FCMBlock"/>
    <translation xmi:type="utility:TranslatableString" key="Patent_flow"
            bundleName="Patent_flow" pluginId="MainFlowOnly"/>
    <colorGraphic16 xmi:type="utility: GIFFileGraphic"
            resourceName=
            "platform:/plugin/MainFlowOnly/icons/full/obj16/Patent_flow.gif"/>
    <colorGraphic32 xmi:type="utility: GIFFileGraphic"
            resourceName=
            "platform:/plugin/MainFlowOnly/icons/full/obj30/Patent_flow.gif"/>
    <!-- Comment: BEGINNING OF MESSAGE FLOW COMPOSITION -->
    <composition>
        <!-- Comment: BEGINNING OF NODE DEFINITIONS -->
        <nodes xmi:type="ComCompanyMQInput.msgnode:FCMComposite_1"
            xmi:id="FCMComposite_1_1" location="125,121"
            queueName="In">
            <translation xmi:type="utility:ConstantString"
                string="MQ Input"/>
        </nodes>
        <nodes
            xmi:type="ComCompanyMQOutput.msgnode:FCMComposite_1"
```

```
            xmi:id="FCMComposite_1_2" location="458,62"
            queueName="Out">
          <translation xmi:type="utility:ConstantString" string="MQ Output"/>
        </nodes>
        <nodes xmi:type="ComCompanyCompute.msgnode:FCMComposite_1"
            xmi:id="FCMComposite_1_3" location="278,121"
            computeExpression="esql://routine/#Patent_flow_Compute.Main">
          <translation xmi:type="utility:ConstantString" string="Compute"/>
        </nodes>
        <nodes
            xmi:type="ComCompanyFileOutput.msgnode:FCMComposite_1"
            xmi:id="FCMComposite_1_4" location="453,182">
          <translation xmi:type="utility:ConstantString" string="File Output"/>
        </nodes>
        <!-- Comment: BEGINNING OF CONNECTION DEFINITIONS -->
        <connections xmi:type="eflow:FCMConnection"
            xmi:id="FCMConnection_1" targetNode="FCMComposite_1_3"
            sourceNode="FCMComposite_1_1"
            sourceTerminalName="OutTerminal.out"
            targetTerminalName="InTerminal.in"/>
        <connections xmi:type="eflow:FCMConnection"
            xmi:id="FCMConnection_2" targetNode="FCMComposite_1_2"
            sourceNode="FCMComposite_1_3"
            sourceTerminalName="OutTerminal.out"
            targetTerminalName="InTerminal.in"/>
        <connections xmi:type="eflow:FCMConnection"
            xmi:id="FCMConnection_3" targetNode="FCMComposite_1_4"
            sourceNode="FCMComposite_1_3"
            sourceTerminalName="OutTerminal.out1"
            targetTerminalName="InTerminal.in"/>
      </composition>
      <propertyOrganizer/>
      <stickyBoard/>
    </eClassifiers>
</ecore:EPackage>
```

Figure 4A:
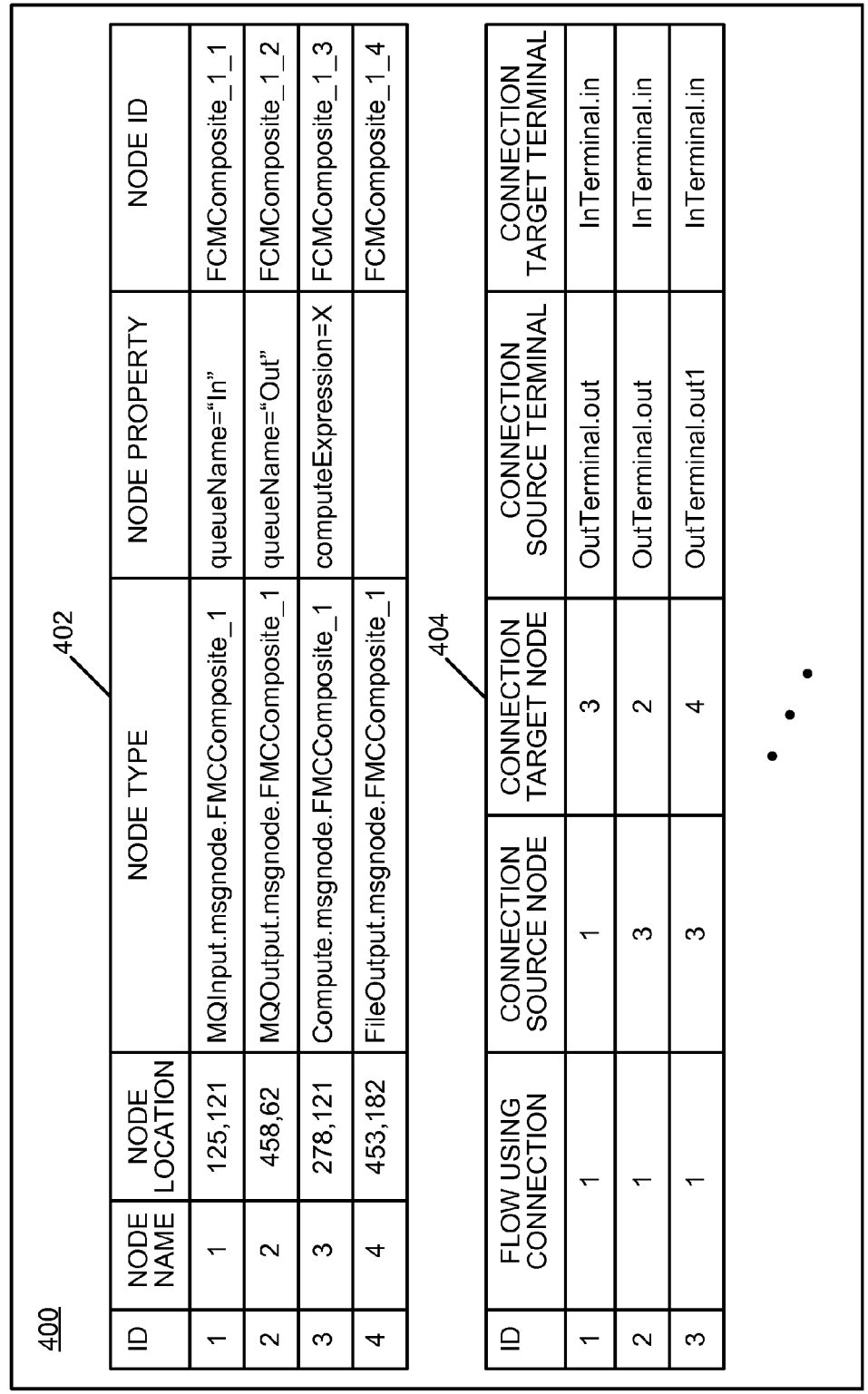
FIG. 4A is a diagram of an example of an implementation of a first portion of a virtual database structure stored within a memory area for automated accessing and editing of virtually-indexed message flows using structured query language (SQL) according to an embodiment of the present subject matter.

FIGS. 4A-4B illustrate a diagram of an example of an implementation of a virtual database structure 400 stored within a memory area, such as the virtual database area 214 of the memory 210, for automated accessing and editing of virtually-indexed message flows using structured query language (SQL). FIG. 4A is a first portion of the virtual database structure 400 and FIG. 4B is a second portion of the virtual database structure 400.

Due to space constraints within the drawing area, the syntax of the compute expression shown within the example pseudo syntax above for the compute node 304 (e.g., computeExpression="esql://routine/#Patent_flow_Compute.Main") is abbreviated (e.g., computeExpression=X). It is understood that the variable X is equivalent to "esql://routine/#Patent_flow_Compute.Main" for purposes of the present examples. It is also understood that the syntax within the example pseudo syntax above is considered to be stored within the virtual database structure 400 for purposes of the present example.

Additionally, the portions of the identifiers that are represented as "ComCompany" (e.g., ComCompanyMQInput-.msgnode:FCMComposite_1) are also abbreviated (e.g., MQInput.msgnode:FCMComposite_1) to omit the "ComCompany" portion of the respective identifiers due to space constraints within FIG. 4, but are understood to be represented as shown within the example pseudo syntax above and are entered in abbreviated form within FIG. 4.

It should additionally be noted that certain fields shown within FIGS. 4A-4B are directly copied into the respective data fields of the virtual database structure 400 from the example pseudo syntax above with certain modifications for space limitations, such as those described above. The content of these fields may be identified by comparison with the example pseudo syntax above. As such, a detailed description of the mapping is self-documenting by reference to the example pseudo syntax above and is not described in detail herein for brevity.

Within FIGS. 4A-4B, three example tables are illustrated. It should be noted that other tables may be used and that additional tables may be generated from the example pseudo syntax. These additional tables may include, for example, a higher-level database table that includes a connections row, a flow properties row, a flows row, a node properties row, and a nodes row. The three example tables of FIGS. 4A-4B are provided for purposes of presenting the technique described herein for creating the virtual database structure 400. It is understood that a person of ordinary skill may create all tables from the example pseudo syntax based upon the three tables that are detailed within FIGS. 4A-4B, and as such, the remaining tables are not illustrated for brevity.

With reference to FIG. 4A, a node table 402 is shown created within the virtual database area 214 of the memory 210 from the example pseudo syntax above, and stores, within a virtual database format, node information for the nodes defined within the node definitions portion of the example pseudo syntax. A first column titled "ID" stores a numeric node identifier of the respective nodes. A last column (far right) titled "NODE ID" stores the node identifier from the example pseudo syntax for each of the respective nodes. As such, the "ID" column in conjunction with the "NODE ID" column form a mapping between the example pseudo syntax and the virtual database structure 400 for purposes of node identification and correlation with the example pseudo syntax.

A "NODE NAME" column stores a numeric node name for the respective nodes. A "NODE TYPE" column stores a type identifier that is referenced for the respective nodes within the example pseudo syntax described above. A "NODE PROP- ERTY" column is also populated with node property information from the example pseudo syntax above for each of the respective nodes. The File Output Node 320 represented in the last row does not have any properties listed because there are no properties listed within the example pseudo syntax for this node. A "NODE LOCATION" column includes graphical coordinates for the respective nodes within the representation of FIG. 3. However, it is understood that FIG. 3 is not drawn to scale and the represented location information is based upon the contents of the example pseudo syntax above.

A connection contents table 404 is illustrated that includes connection information. A column titled "ID" stores a connection identifier for the respective connections that are represented. A column titled "FLOW USING CONNECTION" stores an identifier (ID) of the flow with which the connection table 404 is associated in the "flow" table (not shown). However, it is understood that a flow table may include a row for each flow, with columns that reference the respective node, connection, and properties tables of the respective flows. A "CONNECTION SOURCE NODE" column and a "CONNECTION TARGET NODE" column represent the respective node identifiers from the "ID" column of the node table 402 for the respective nodes. A "CONNECTION SOURCE TERMINAL" and "CONNECTION TARET TERMINAL" column store terminal names represented and copied from the example pseudo syntax above.

With reference to FIG. 4B, a node properties table 406 is shown created within the virtual database area 214 of the memory 210 from the example pseudo syntax above, and stores, within a virtual database format, node property information for the nodes defined within the node definitions portion of the example pseudo syntax. A first column titled "ID" stores an identifier that represents a property identifier for the respective node properties. A "NODE USING PROPERTY" column stores node identifiers from the node table 402 for the respective nodes that have the respective node properties. A "NODE PROPERTY NAME" column stores a property name for the respective properties. Two options are possible for this column, "nodes" and "translation." Reference to the example pseudo syntax above shows the node property via a "nodes" tag pair for each node and shows a translation property via a "translation" tag pair for each node. A "NODE PROPERTY VALUE" column stores the content associated with the respective tag pairs for each node referenced within the node properties table 406. It should be noted that the fields of the "NODE PROPERTY VALUE" column are also cross referenced within the node table 402 described above.

As such, FIGS. 4A-4B provide example tables within a virtual database format that are a part of the virtual database structure 400. It is understood that additional tables may be created from the example pseudo syntax above. As such, each such additional table is considered within the scope of the present subject matter. It is also understood that SQL statements may be issued against the virtual database structure 400 and that values of the respective column/row combinations may be returned and/or modified by the SQL statements. As such, the virtual database structure 400 provides an improved technique for editing message flows. Further, as described above, any changes to the message flow represented within the virtual database structure 400 may be written to one or more message flow files, and the changed message flow may be implemented or modified within a runtime environment.

Figure 5:
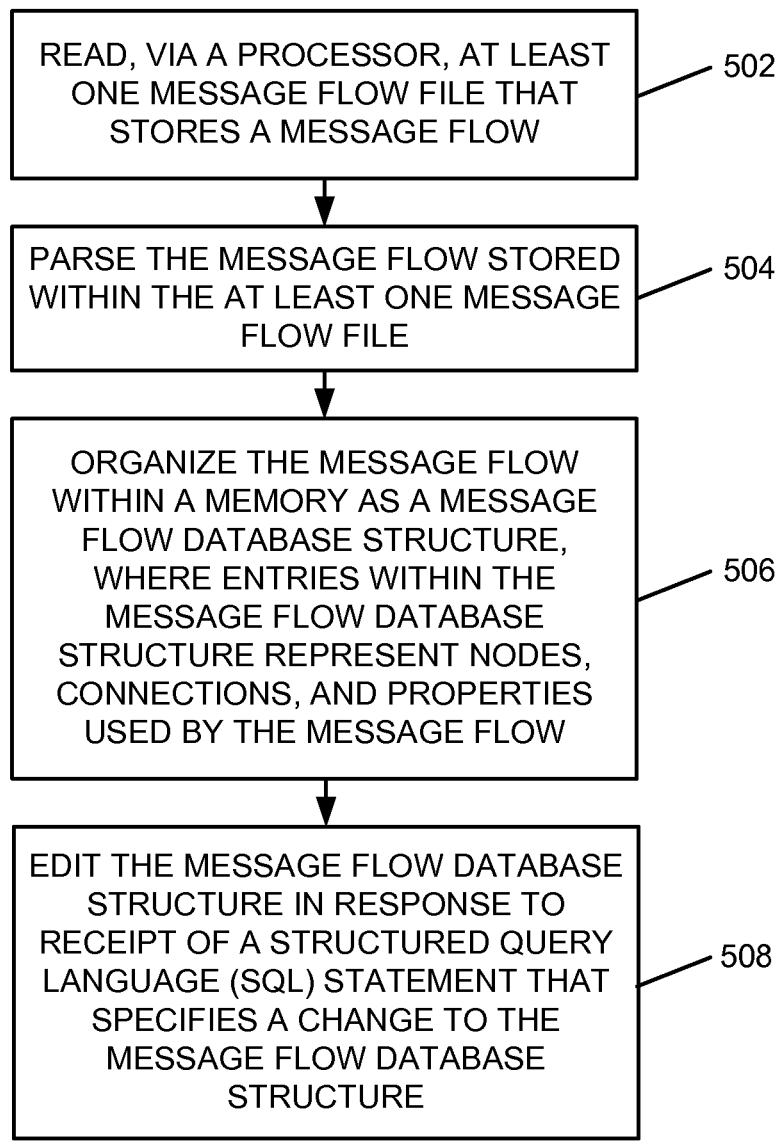
FIG. 5 is a flow chart of an example of an implementation of a process for automated accessing and editing of virtually-indexed message flows using structured query language (SQL) according to an embodiment of the present subject matter.
Figure 6A:
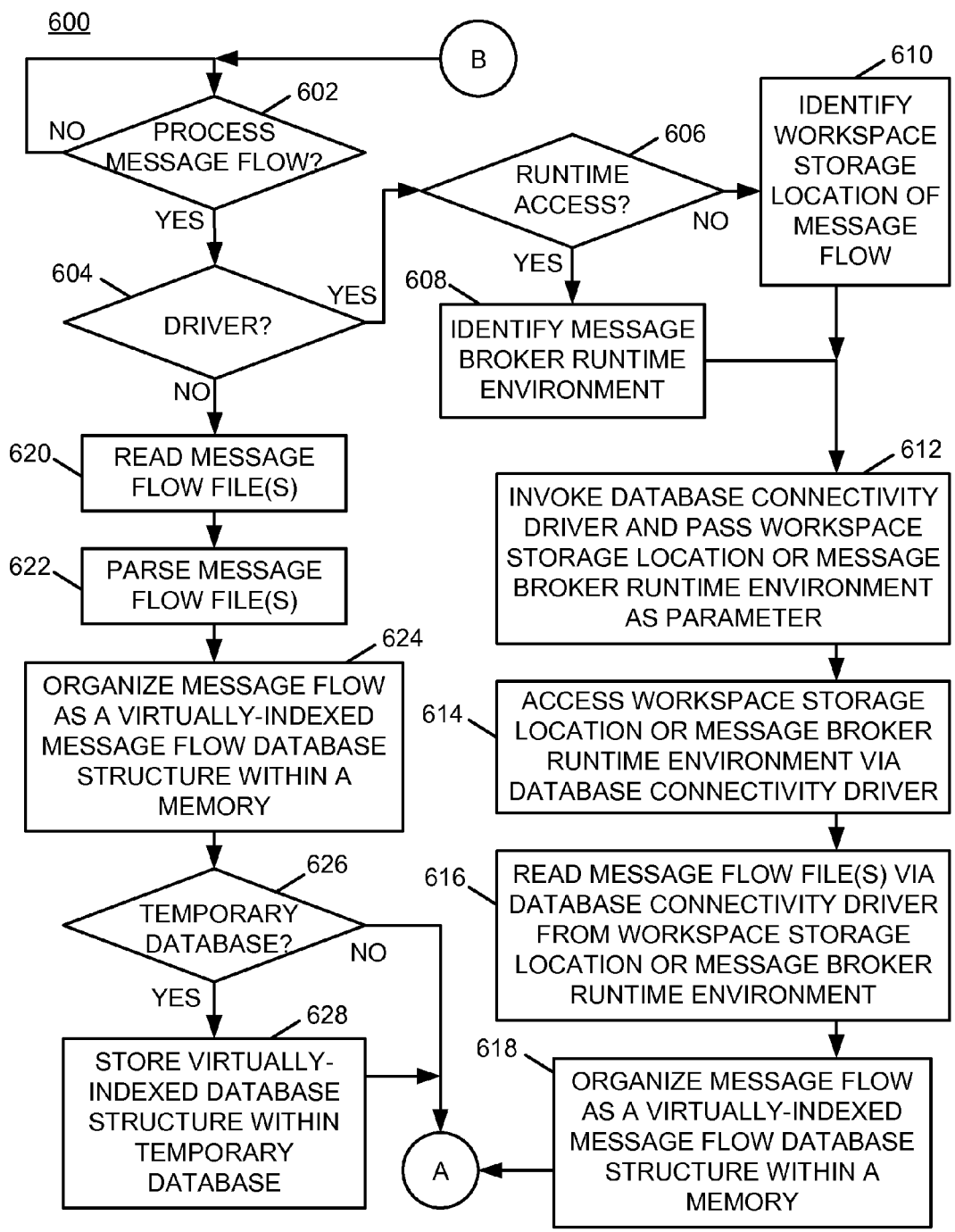
FIG. 6A is a flow chart of an example of initial processing within an implementation of a process for automated accessing and editing of virtually-indexed message flows using structured query language (SQL) according to an embodiment of the present subject matter.
Figure 6B:
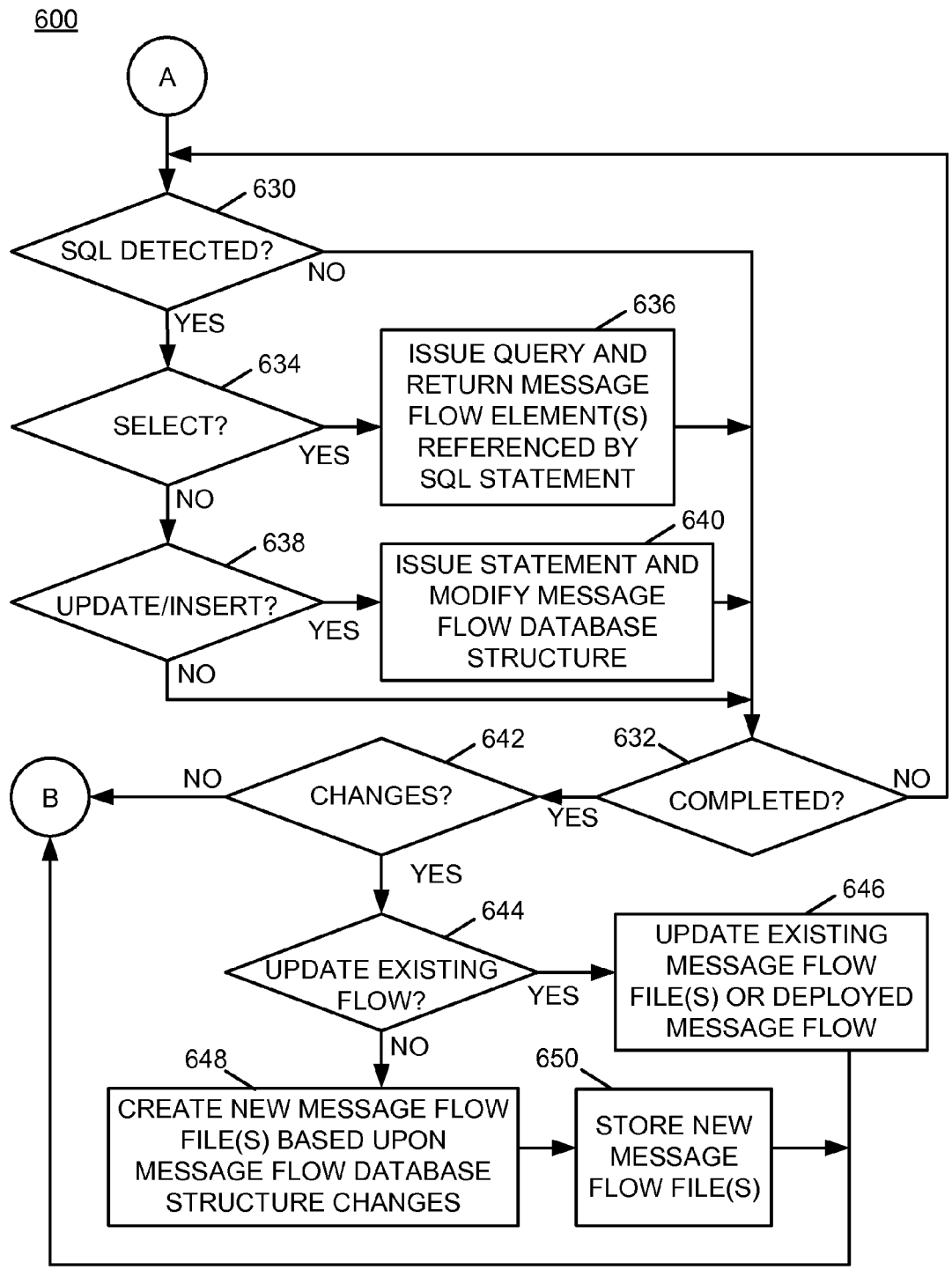
FIG. 6B is a flow chart of an example additional processing within an implementation of a process for automated accessing and editing of virtually-indexed message flows using structured query language (SQL) according to an embodiment of the present subject matter.

FIG. 5 through FIG. 6B described below represent example processes that may be executed by devices, such as the core processing module 200, to perform the automated accessing and editing of virtually-indexed message flows using structured query language (SQL) associated with the present subject matter. Many other variations on the example processes are possible and all are considered within the scope of the present subject matter. The example processes may be performed by modules, such as the message flow processing module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 5 is a flow chart of an example of an implementation of a process 500 for automated accessing and editing of virtually-indexed message flows using structured query language (SQL). At block 502, the process 500 reads, via a processor, at least one message flow file that stores a message flow. At block 504, the process 500 parses the message flow stored within the at least one message flow file. At block 506, the process 500 organizes the message flow within a memory as a message flow database structure, where entries within the message flow database structure represent nodes, connections, and properties used by the message flow. At block 508, the process 500 edits the message flow database structure in response to receipt of a structured query language (SQL) statement that specifies a change to the message flow database structure.

FIGS. 6A-6B illustrate a flow chart of an example of an implementation of process 600 for automated accessing and editing of virtually-indexed message flows using structured query language (SQL). FIG. 6A illustrates initial processing within the process 600. At decision point 602, the process 600 makes a determination as to whether to process a message flow. The determination to process a message flow may be made in response to receipt of a command-line instruction from a user via a command-line interface, in response to receipt of a command entered within a graphical user interface (GUI), or otherwise as appropriate for a given implementation.

In response to determining to process a message flow, the process 600 makes a determination as to whether the request to process the message flow is a request to process the message flow using a virtual database driver at decision point 604. In response to determining at decision point 604 that the request to process the message flow is a request to process the message flow using a virtual database driver, the process 600 makes a determination at decision point 606 as to whether the request to process the message flow includes a request to process the message flow within a message broker runtime environment within which the message flow is deployed or whether the request to process the message flow includes a request to process the message flow from a workspace storage location.

In response to determining at decision point 606 that the request to process the message flow includes a request to process the message flow within a message broker runtime environment within which the message flow is deployed, the process 600 identifies the message broker runtime environment at block 608. In response to determining at decision point 606 that the request to process the message flow includes a request to process the message flow from a workspace storage location, the process 600 identifies the workspace storage location where one or more message flow files that include the message flow are stored at block 610.

In response to either identifying the message broker runtime environment at block 608 or identifying the workspace storage location at block 610, the process 600 invokes a database connectivity driver to process a structured query language (SQL) statement against the message flow and passes at least one parameter to the database connectivity driver that represents/identifies either the workspace storage location or the message broker runtime environment where the message flow is stored or deployed, respectively, at block 612. As described above and in more detail below, the message flow may be organized as a message flow database structure without requiring the message flow database structure to be loaded into an actual database or temporary database. Additionally, the database connectivity driver may include a driver, such as an open database connectivity (ODBC) driver or a Java database connectivity (JDBC®) driver. For purposes of the present description, the database connectivity driver may be considered any database connectivity driver, such as a database connectivity driver programmed using an object-oriented programming language.

At block 614, the process 600 accesses the workspace storage location or the message broker runtime environment via the database connectivity driver. At block 616, the process 600 reads, via the database connectivity driver, at least one message flow file that stores a message flow from the workspace storage location or from the message broker runtime environment where the message flow is stored or deployed, respectively. As described above, the parameter passed to the database connectivity driver at invocation is used to identify the location of the stored message flow files or the message broker runtime environment.

At block 618, the process 600 organizes the message flow as a virtually-indexed message flow database structure within a memory location, such as the virtual database area 214 of the memory 210. Organizing the message flow within a memory as a virtually-indexed message flow database structure may include organizing the message flow within a memory as a message flow database structure, where entries within the message flow database structure represent nodes, connections, and properties used by the message flow. Additionally, organizing the message flow within a memory as a virtually-indexed message flow database structure may include creating tables linked based upon message flow connections that represent relationships between message processing nodes of the message flow. Additionally, the linked tables may each represent one message flow processing node of the message flow and columns of each linked table may each represent one property of the respective message flow processing node. Additional processing for this branch of the process 600 will be described in more detail further below.

Returning to the description of decision point 604, in response to determining that the request to process the message flow is not a request to process the message flow using a virtual database driver, the process 600 reads one or more message flow files that store the message flow at block 620. At block 622, the process 600 parses the message flow stored within the message flow file(s). At block 624, similar to the processing described above, the process 600 organizes the message flow as a virtually-indexed message flow database structure within a memory location, such as the virtual database area 214 of the memory 210. Organizing the message flow within a memory as a virtually-indexed message flow database structure may include organizing the message flow within a memory as a message flow database structure, where entries within the message flow database structure represent nodes, connections, and properties used by the message flow. Additionally, organizing the message flow within a memory as a virtually-indexed message flow database structure may include creating tables linked based upon message flow connections that represent relationships between message processing nodes of the message flow. Additionally, the linked tables may each represent one message flow processing node of the message flow and columns of each linked table may each represent one property of the respective message flow processing node.

At decision point 626, the process 600 makes a determination as to whether to store the virtually-indexed message flow database structure to a temporary database for processing SQL statements against the virtually-indexed message flow database structure. As such, it should be noted that loading the virtually-indexed message flow database structure into an actual database is considered optional processing.

In response to determining to store the virtually-indexed message flow database structure to a temporary database for processing SQL statements against the virtually-indexed message flow database structure, the process 600 stores the virtually-indexed message flow database structure to a temporary database at block 628. The temporary database may include any memory device, such as a temporary database organized within the database 112 or within the memory 210, as appropriate for the given implementation. Structured query language (SQL) statements may be processed against the message flow database structure stored within the temporary database.

In response to determining not to store the virtually-indexed message flow database structure to a temporary database for processing SQL statements against the virtually-indexed message flow database structure at decision point 626, or in response to storing the virtually-indexed message flow database structure to a temporary database at block 628, or in response to organizing the message flow as a virtually-indexed message flow database structure within a memory location at block 618, the process 600 transitions to decision point 630 and the processing shown and described in association with FIG. 6B.

FIG. 6B illustrates additional processing associated with the process 600 for automated accessing and editing of virtually-indexed message flows using structured query language (SQL). At decision point 630, the process 600 makes a determination as to whether a structured query language (SQL) statement to process against the virtually-indexed message flow database structure has been detected. Detecting an SQL statement may include detecting user entry of an SQL statement via one of a command-line user interface and a graphical user interface (GUI)

In response to determining that an SQL statement to process against the virtually-indexed message flow database structure has not been detected, the process 600 makes a determination at decision point 632 as to whether processing to detect SQL statements is completed. In response to determining that processing to detect SQL statements is not completed, the process 600 returns to decision point 630 and iterates as described above.

In response to determining at decision point 630 that an SQL statement to process against the virtually-indexed message flow database structure has been detected, the process 600 makes a determination at decision point 634 as to whether the detected SQL statement is an SQL "SELECT" statement. In response to determining that the detected SQL statement is an SQL "SELECT" statement, the process 600 issues the SELECT query against the virtually-indexed message flow database structure (either via the database connectivity driver or directly, and either within a memory or within a temporary database) and returns the message flow element(s) referenced by the SQL SELECT statement at block 636. The process 600 returns to decision point 632 and iterates as described above until a determination is made that processing of SQL statements is completed.

Returning to the description of decision point 634, in response to determining that the detected SQL statement is not an SQL "SELECT" statement, the process 600 makes a determination at decision point 638 as to whether the detected SQL statement is an SQL "UPDATE" or SQL "INSERT" statement. In response to determining that the detected SQL statement is not an SQL "UPDATE" or SQL "INSERT" statement, the process 600 returns to decision point 632 and iterates as described above until a determination is made that processing of SQL statements is completed.

In response to determining at decision point 638 that the detected SQL statement is an SQL "UPDATE" or SQL "INSERT" statement, the process 600 issues the SQL statement against the virtually-indexed message flow database structure (again either via the database connectivity driver or directly, and either within a memory or within a temporary database) to edit the virtually-indexed message flow database structure according to the SQL UPDATE or SQL INSERT statement that specifies the change to the message flow database structure at block 640. Editing the virtually-indexed message flow database structure may include modifying/changing at least one of the linked tables of the message flow database structure in response to the SQL UPDATE statement and adding at least one message flow object in response to the SQL INSERT statement. As such, a user may select objects from the tables to get information about the objects and may also update or insert rows into the tables, which will modify or add objects to edit the message flow. In response to completion of processing of the SQL statement at block 640, the process 600 returns to decision point 632 and iterates as described above until a determination is made that processing of SQL statements is completed.

In response to determining at decision point 632 that processing of SQL statements is completed, such as via a user input or closing of an application that processes the SQL statements, the process 600 makes a determination at decision point 642 as to whether any changes to the virtually-indexed message flow database structure have resulted from the processing of the SQL statements against the virtually-indexed message flow database structure. In response to determining that at least one change to the virtually-indexed message flow database structure has not resulted from the processing of the SQL statements against the virtually-indexed message flow database structure, the process 600 returns to the processing described in association with FIG. 6A at decision point 602 and iterates as described above.

In response to determining at decision point 642 that at least one change to the virtually-indexed message flow database structure has resulted from the processing of the SQL statements against the virtually-indexed message flow database structure, the process 600 makes a determination at decision point 644 as to whether to update the existing/current message flow, either within the workspace storage location or within the message broker runtime environment, based upon the virtually-indexed message flow database structure changes. In response to determining to update the existing message flow in response to the virtually-indexed message flow database structure changes, the process 600 updates the existing message flow (e.g., message flow files or deployed message flow) based upon the changes to the virtually-indexed message flow database structure at block 646.

In response to determining not to update the existing message flow at decision point 644, the process 600 creates at least one new message flow file based upon the virtually-indexed message flow database structure and the changed at least one of the linked tables of the message flow database structure at block 648. It should be noted that the user may also be prompted to overwrite the previous message flow file(s) and the respective message flow file(s) may be overwritten rather than creating new message flow files as appropriate for a given implementation. At block 650, the process 600 stores the new message flow file(s). Storage of the new message flow files may include deploying the new message flow within the message broker runtime environment without departure from the scope of the present subject matter.

In response to either updating the existing message flow at block 646 or in response to storing the created message flow file(s) at block 650, the process 600 returns to the processing described in association with FIG. 6A at decision point 602 and iterates as described above.

As such, the process 600 detects requests to process message flows and creates a virtually-indexed message flow database structure, either directly or using a database connectivity driver, from a message flow that is either stored within one or more message flow files in a workspace storage location or from a message flow that is deployed within a message broker runtime environment. Additionally, the virtually-indexed message flow database structure is either stored and processed within a memory, or is stored and processed within a temporary database. SQL statements are processed against the virtually-indexed message flow database structure, and any updates are applied to the virtually-indexed message flow database structure. The original message flow may be overwritten either within the workspace storage location or within a message broker runtime environment, or one or more new message flow files may be created in response to any changes to the message flow. Any created or updated message flow files may be stored within the respective storage location(s).

It should be noted that certain SQL statements have been described in association with the process 600 for purposes of example and that many other SQL statements are possible. As such, any SQL statement may be processed against a virtually-indexed message flow database structure as described herein and as appropriate for a given implementation. Accordingly, all such SQL statements are considered within the scope of the present subject matter.

As described above in association with FIG. 1 through FIG. 6B, the example systems and processes provide for accessing and editing of virtually-indexed message flows using structured query language (SQL). Many other variations and additional activities associated with accessing and editing of virtually-indexed message flows using structured query language (SQL) are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   reading, via a processor, at least one message flow file that stores a message flow;
   parsing the message flow stored within the at least one message flow file;
   organizing the message flow within a memory as a message flow database structure, where entries within the message flow database structure represent nodes, connections, and properties used by the message flow; and
   editing the message flow database structure in response to receipt of a structured query language (SQL) statement that specifies a change to the message flow database structure;
   where editing the message flow database structure in response to receipt of the SQL statement that specifies the change to the message flow database structure comprises invoking a database connectivity driver to process the SQL statement to edit the message flow database structure;
   where the database connectivity driver comprises a virtual database driver; and
   where invoking the database connectivity driver to process the SQL statement to edit the message flow database structure comprises:
      identifying a workspace storage location where the at least one message flow file is stored;
      passing at least one parameter to the virtual database driver that comprises the workspace storage location where the at least one message flow file is stored;
      accessing, via the virtual database driver, the workspace storage location;
      where reading, via the processor, the at least one message flow file that stores the message flow comprises reading, via the virtual database driver, the at least one message flow file that stores the message flow from the workspace storage location in response to being invoked with the at least one parameter; and
      editing the message flow database structure via the virtual database driver.

2. The method of claim 1, where editing the message flow database structure in response to receipt of the SQL statement that specifies the change to the message flow database structure further comprises:
   detecting user entry of the SQL statement via one of a command-line user interface and a graphical user interface (GUI); and
   processing the SQL statement against the message flow database structure in response to detection of the user entry of the SQL statement to edit the message flow database structure.

3. The method of claim 1, where the SQL statement comprises one of an SQL UPDATE statement and an SQL INSERT statement and where editing the message flow database structure in response to receipt of the SQL statement that specifies the change to the message flow database structure further comprises modifying at least one table of the message flow database structure in response to the SQL statement comprising the SQL UPDATE statement and adding at least one message flow object in response to the SQL statement comprising the SQL INSERT statement.

4. The method of claim 3, further comprising:
   creating at least one new message flow file based upon the edited message flow database structure; and
   storing the at least one new message flow file.

5. The method of claim 1, where:
   reading, via the processor, the at least one message flow file that stores the message flow further comprises reading the at least one message flow file from a message broker runtime environment where the message flow is deployed; and
   editing the message flow database structure in response to receipt of the SQL statement that specifies the change to the message flow database structure further comprises processing the SQL statement against the message flow deployed within the message broker runtime environment to edit the deployed message flow.

6. A system, comprising:
   a memory; and
   a processor programmed to:
      read at least one message flow file that stores a message flow;
      parse the message flow stored within the message flow file;
      organize the message flow within the memory as a message flow database structure, where entries within the message flow database structure represent nodes, connections, and properties used by the message flow; and
      edit the message flow database structure in response to receipt of a structured query language (SQL) statement that specifies a change to the message flow database structure;
      where in being programmed to edit the message flow database structure in response to receipt of the SQL statement that specifies the change to the message flow database structure, the processor is programmed to invoke a database connectivity driver to process the SQL statement to edit the message flow database structure;
      where the database connectivity driver comprises a virtual database driver; and
      where in being programmed to invoke the database connectivity driver to process the SQL statement to edit the message flow database structure, the processor is programmed to:

identify a workspace storage location where the at least one message flow file is stored;
pass at least one parameter to the virtual database driver that comprises the workspace storage location where the at least one message flow file is stored;
access, via the virtual database driver, the workspace storage location;
where in being programmed to read the at least one message flow file that stores the message flow, the processor is programmed to read, via the virtual database driver, the at least one message flow file that stores the message flow from the workspace storage location in response to being invoked with the at least one parameter; and
edit the message flow database structure via the virtual database driver.

7. The system of claim 6, where in being programmed to edit the message flow database structure in response to receipt of the SQL statement that specifies the change to the message flow database structure, the processor is further programmed to:
detect user entry of the SQL statement via one of a command-line user interface and a graphical user interface (GUI); and
process the SQL statement against the message flow database structure in response to detection of the user entry of the SQL statement to edit the message flow database structure.

8. The system of claim 6, where the SQL statement comprises one of an SQL UPDATE statement and an SQL INSERT statement and where in being programmed to edit the message flow database structure in response to receipt of the SQL statement that specifies the change to the message flow database structure, the processor is further programmed to modify at least one table of the message flow database structure in response to the SQL statement comprising the SQL UPDATE statement and to add at least one message flow object in response to the SQL statement comprising the SQL INSERT statement.

9. The system of claim 6, where:
in being programmed to read the at least one message flow file that stores the message flow, the processor is further programmed to read the at least one message flow file from a message broker runtime environment where the message flow is deployed; and
in being programmed to edit the message flow database structure in response to receipt of the SQL statement that specifies the change to the message flow database structure, the processor is further programmed to process the SQL statement against the message flow deployed within the message broker runtime environment to edit the deployed message flow.

10. The system of claim 6, where the processor is further programmed to:
create at least one new message flow file based upon the edited message flow database structure; and
store the at least one new message flow file.

11. A computer program product comprising a computer readable storage medium including computer readable program code, where the computer readable program code when executed on a computer causes the computer to:
read at least one message flow file that stores a message flow;
parse the message flow stored within the at least one message flow file;
organize the message flow within a memory as a message flow database structure, where entries within the message flow database structure represent nodes, connections, and properties used by the message flow; and
edit the message flow database structure in response to receipt of a structured query language (SQL) statement that specifies a change to the message flow database structure;
where in causing the computer to edit the message flow database structure in response to receipt of the SQL statement that specifies the change to the message flow database structure, the computer readable program code when executed on the computer causes the computer to invoke a database connectivity driver to process the SQL statement to edit the message flow database structure;
where the database connectivity driver comprises a virtual database driver; and
where in causing the computer to invoke the database connectivity driver to process the SQL statement to edit the message flow database structure, the computer readable program code when executed on the computer causes the computer to:
identify a workspace storage location where the at least one message flow file is stored;
pass at least one parameter to the virtual database driver that comprises the workspace storage location where the at least one message flow file is stored;
access, via the virtual database driver, the workspace storage location; and
where in causing the computer to read the at least one message flow file that stores the message flow, the computer readable program code when executed on the computer causes the computer to read, via the virtual database driver, the at least one message flow file that stores the message flow from the workspace storage location in response to being invoked with the at least one parameter; and
edit the message flow database structure via the virtual database driver.

12. The computer program product of claim 11 where in causing the computer to edit the message flow database structure in response to receipt of the SQL statement that specifies the change to the message flow database structure, the computer readable program code when executed on the computer further causes the computer to:
detect user entry of the SQL statement via one of a command-line user interface and a graphical user interface (GUI); and
process the SQL statement against the message flow database structure in response to detection of the user entry of the SQL statement to edit the message flow database structure.

13. The computer program product of claim 11, where the SQL statement comprises one of an SQL UPDATE statement and an SQL INSERT statement and where in causing the computer to edit the message flow database structure in response to receipt of the SQL statement that specifies the change to the message flow database structure, the computer readable program code when executed on the computer further causes the computer to modify at least one table of the message flow database structure in response to the SQL statement comprising the SQL UPDATE statement and to add at least one message flow object in response to the SQL statement comprising the SQL INSERT statement.

14. The computer program product of claim 13, where the computer readable program code when executed on the computer further causes the computer to:

create at least one new message flow file based upon the edited message flow database structure; and store the at least one new message flow file.

15. The computer program product of claim 11, where:

in causing the computer to read the at least one message flow file that stores the message flow, the computer readable program code when executed on the computer further causes the computer to read the at least one message flow file from a message broker runtime environment where the message flow is deployed; and in causing the computer to edit the message flow database structure in response to receipt of the SQL statement that specifies the change to the message flow database structure, the computer readable program code when executed on the computer further causes the computer to process the SQL statement against the message flow deployed within the message broker runtime environment to edit the deployed message flow.

\* \* \* \* \*